Patented Dec. 8, 1936

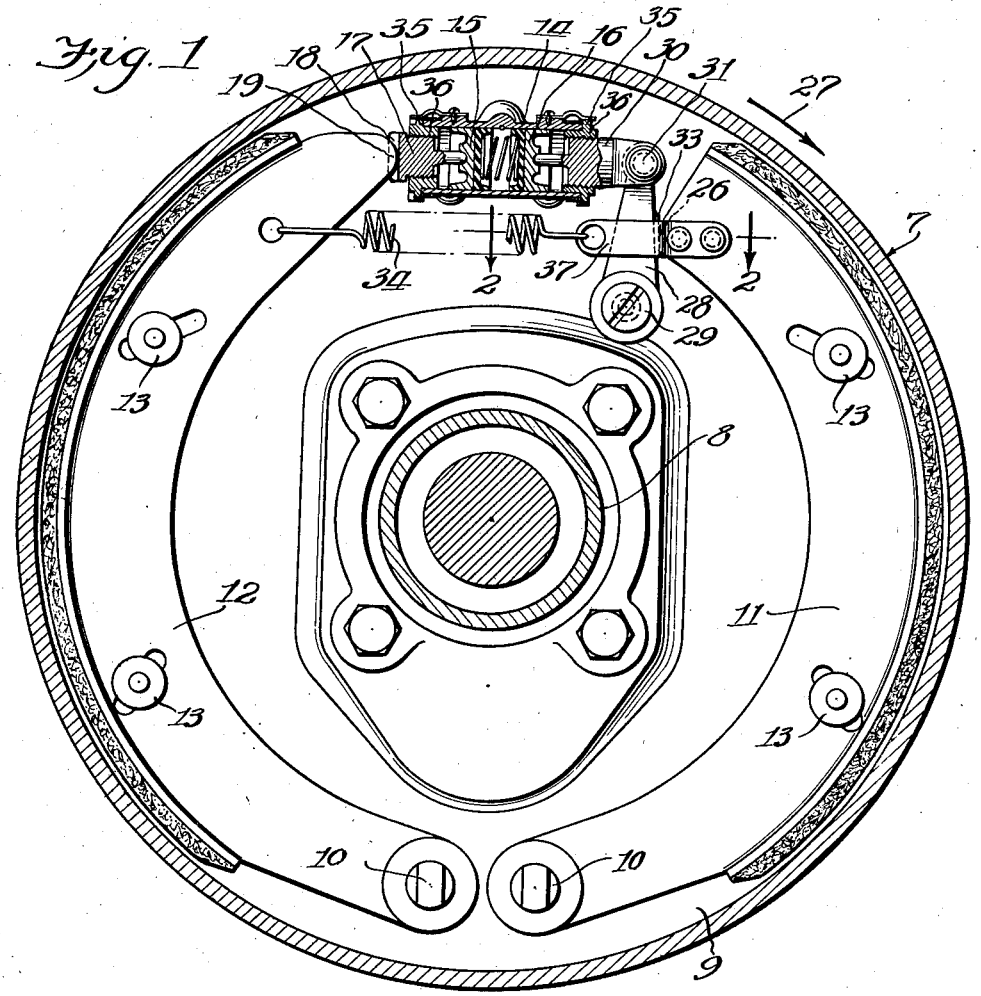
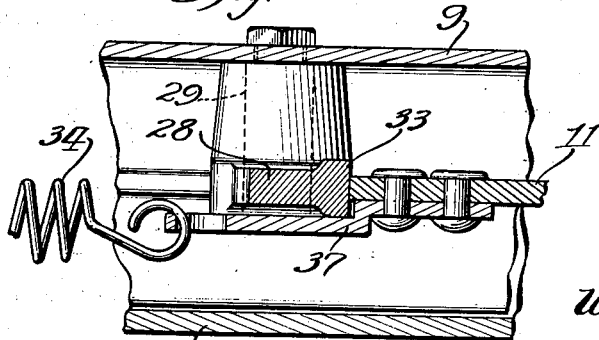

2,063,618

UNITED STATES PATENT OFFICE 2,063,618

BRAKING APPARATUS

Wallace F. Oliver, Detroit, Mich., assignor to Hydraulic Brake Company, Detroit, Mich., a corporation of California Original application December 31, 1931, Serial No. 584,037. Divided and this application December 23, 1932, Serial No. 648,526

5 Claims. (Cl. 188—152)

My invention relates to braking apparatus in general but is particularly desirable for use in connection with the braking apparatus of automobiles and other motor vehicles, although its utility is not limited to such uses.

In view of the present tendency to increase the weight and possible speed of automotive vehicles and the insistent demand of the motoring public that the necessary effort required conveniently to handle such vehicles under all conditions be minimized, I have provided a brake system in which the braking efficiency of the apparatus is increased without an increase in the amount of pedal pressure necessary for effecting application of the brakes.

An object of my invention, therefore, is to provide a more efficient brake system which will give increased braking effect without requiring the operator to exert increased effort on the operating controls.

A further object of my invention is the provision of a more efficient braking system in which force multiplying means are utilized for increasing the pressure exerted by the operator on the operating controls in effecting the application of the brakes.

Another object is to provide a braking system embodying the foregoing features and which may be economically manufactured, has a minimum number of parts, and is durable and absolutely reliable in service.

Other objects and advantages will become apparent as the description proceeds.

Referring to the drawing, of which there is one sheet:

Figure 1 is a vertical elevational view, partly in section, and showing my invention applied to the wheel brake mechanism of an automobile; and Figure 2 is a horizontal sectional view taken on the line 2—2 of Figure 1 and showing details of the connection between the brake shoe and the force multiplying means.

I have illustrated my invention as applied to the wheel brake mechanism of an automobile which consists, in general, of a brake drum 7 suitably secured to the vehicle wheel by any well known means, and an axle housing 8 to which is secured a pan 9 which cooperates with the brake drum 7 to provide an enclosure in which are located the operating parts of the brake mechanism. Supporting pins 10 are attached to the pan 9 and carry brake shoes 11 and 12 which are normally located in the positions shown but which are capable of movement into engagement with the brake drum 7 by mechanism which will be generally described hereinafter. The pan 9 also supports guides 13 which guide the brake shoes 11 and 12 during their movement between active and inactive position.

A motor cylinder 14 is suitably secured to the pan 9 between the free ends of the brake shoes 11 and 12. This motor cylinder is of uniform bore throughout and is provided with opposed pistons 15 and 16 which are operable to move the brake shoes 11 and 12 into braking engagement with the drum 7 when fluid under pressure is forced into the cylinder 14 by suitable fluid compressing means and conduits which may be of the type disclosed in United States patent No. 1,758,671, or which may be of any other suitable or desirable type.

The piston 15 is directly connected with the brake shoe 12 by a piston rod 17 which has one end rounded to fit into a socket formed in the rear side of the piston 15 and which forms a separable connection therewith. The other end of the piston rod 17 is provided with a slot 18 into which projects the rounded end 19 of the brake shoe 12. The engagement of the end 19 in the slot 18 prevents rotation of the piston rod 17. The specific construction of the cylinder and piston is described and claimed in my prior application for Letters Patent on Braking apparatus, filed December 3, 1931, Serial No. 584,037, and forms no part of the invention described and claimed in this application which is a division of my said prior application.

When the vehicle is moving in the forward direction the brake drum 7 rotates in the direction of the arrow 27 so that the brake shoe 11 is what is commonly referred to as the forward shoe, whereas the brake shoe 12 is what is commonly known as the trailing shoe. It is well known that where equal pressures are applied to the forward shoe and the trailing shoe much more braking effect is created by the forward shoe. In order to increase the effectiveness of the braking apparatus without increasing the pedal pressure which the operator must exert, I increase the force which is exerted on the forward shoe and thereby greatly increase the efficiency of the braking apparatus. This is accomplished by the interposition of a lever 28 pivoted to the pan 9 by a pin 29 between the brake shoe 11 and the piston rod 30. The piston rod 30 has one end rounded to fit into a socket formed in the rear side of the piston 16 for forming a separable connection therewith and has the other end thereof pivoted to the upper end of the lever 28 by a pin 31, or any other suitable connection.

At the point where the lever 28 contacts the beveled end 26 of the brake shoe 11, the lever is provided with a boss 33 which, in the present embodiment, is located midway between the pins 29 and 31 so that twice as much force is exerted on the brake shoe 11 as on the brake shoe 12.

A retractile spring 34 is provided for moving the brake shoes into inactive position. The retractile movement of the brake shoes is limited by shoulders 35 externally formed on annuli 36 in which the piston rods are secured and which annuli are slidable within the cylinder bore 14. One end of the retractile spring 34 is connected to a link 37 which in turn is connected to the brake shoe 11. Under some conditions it is found desirable to have this link rest against the side of and form a guide for the lever 28 to prevent vibration and rattling thereof.

The retractile spring 34 must be of a strength sufficient to return the brake shoes to inactive position and also to retract the pistons 15 and 16 with sufficient force to drive the fluid from the cylinder 14 back through the conduits and past the return valve which is commonly associated with the discharge end of the fluid compressor. Such a return valve is indicated by reference numeral 26 in Loughead Patent No. 1,847,402, dated March 1, 1932.

While I have shown my invention as applied to a hydraulic braking system, it is apparent that it may equally well be applied to mechanical or other type of braking system.

Having thus described my invention I wish it to be understood that it is capable of being incorporated in various forms and that the scope of my invention is to be limited solely by the following claims.

I claim:

1. In braking mechanism of the class described, the combination of a rotatable member, a forward brake shoe, a reverse brake shoe, pivots for said shoes, means for actuating said shoes, said means being directly connected to said reverse shoe, a lever interposed between said means and said forward shoe to multiply the force applied by said means to said forward shoe, and guide means for said lever carried by said forward shoe.

2. In braking apparatus of the class described, the combination of a rotatable member, forward and reverse shoes adapted to be moved into engagement with said member, means for moving said shoes into engagement with said member, said means being directly connected to one of said shoes, force multiplying means interposed between said last-named means and said forward shoe, a guide for said force multiplying means carried by said forward shoe, and retractile means for said shoes connected to said guide.

3. In braking apparauts of the class described, the combination of a rotatable member, forward and reverse shoes adapted to be brought into engagement therewith, means for applying said shoes, said means being directly connected to said reverse shoe, a non-yielding force multiplying connection between said applying means and said forward shoe, and a single spring connected to said shoes for moving the same away from said rotatable member.

4. In braking apparatus of the class described, the combination of a rotatable member, a forward shoe, a reverse shoe, applying means, said applying means being directly connected to said reverse shoe, non-yielding force multiplying connection between said applying means and said forward shoe, and returns means for said shoes.

5. In braking apparatus of the class described, the combination of a rotatable member, a forward shoe, a reverse shoe, a double-ended hydraulic cylinder, a piston in one end of said cylinder directly connected to said reverse shoe, a force multiplying lever associated with said forward shoe, a piston in the other end of said cylinder connected to said lever, said cylinder adapted to provide the increased travel necessitated by said lever, and spring means for moving said shoes out of engagement with said rotatable member.

WALLACE F. OLIVER.